United States Patent [19]

Sarkar

[11] Patent Number: 4,599,098
[45] Date of Patent: Jul. 8, 1986

[54] OPTICAL FIBER AND METHOD OF PRODUCING SAME

[75] Inventor: Arnab Sarkar, Westhills, Calif.

[73] Assignee: Lightwave Technologies, Inc., Van Nuys, Calif.

[21] Appl. No.: 579,496

[22] Filed: Feb. 13, 1984

[51] Int. Cl.$^4$ .......................................... C03B 37/018
[52] U.S. Cl. ...................................... 65/3.12; 65/3.2
[58] Field of Search .................. 65/3.12, 3.11, 3.1, 65/3.2, 13, 18.2

[56] References Cited

U.S. PATENT DOCUMENTS

| 3,823,995 | 7/1974 | Carpenter | 65/3.12 X |
| 4,227,907 | 10/1980 | Merritt | 65/3.12 X |
| 4,360,371 | 11/1982 | Blankenship | 65/18.2 X |

FOREIGN PATENT DOCUMENTS 57-209845  12/1982  Japan ................................ 65/3.12

*Primary Examiner*—Kenneth M. Schor
*Attorney, Agent, or Firm*—Fraser and Bogucki

[57] ABSTRACT

Low signal attenuation optical fibers and methods for making such fibers mimimize the internal and interface defects while providing high throughput by radial deposition of successive particulate layers about a small diameter start element and co-vitrification of the layers followed by drawing to the small final diameter that is desired. Radial vapor deposition of an interface layer on the start element, followed by an encompassing core and then a cladding provides boundaries that form transitional continuums after the structure has been vitrified. The start element remains as part of the core but is so small as to have no discernible effect on light propagation, and the number of interfaces in the light propagating portion is limited by maintaining the ratio of the cladding thickness to the core radius to less than 1.5 in the initial preform. By drawing this preform to form separate rods, additional cladding is applied to form a fiber preform from which optical fibers may be drawn.

9 Claims, 7 Drawing Figures

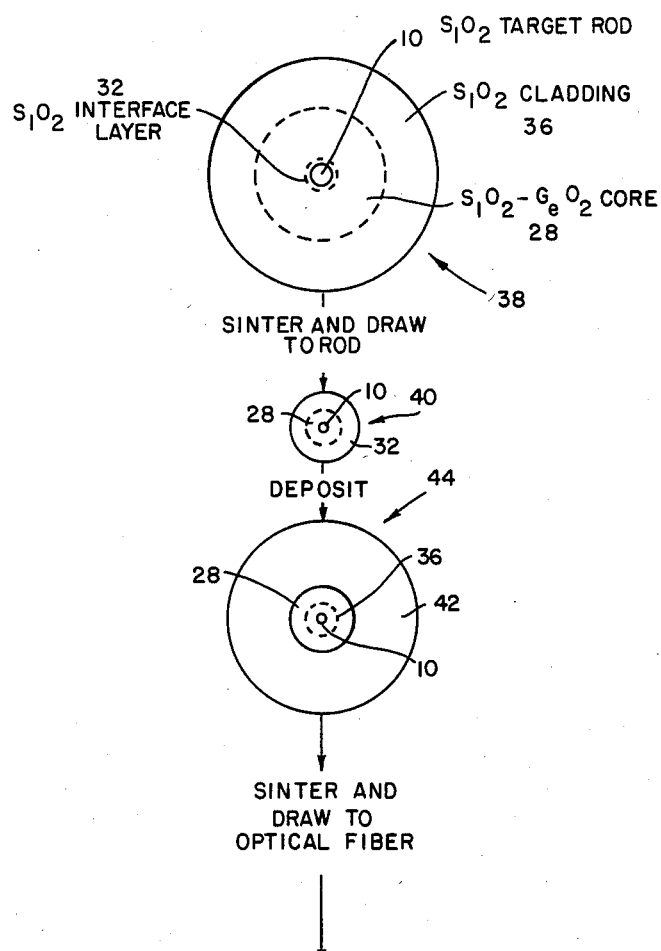
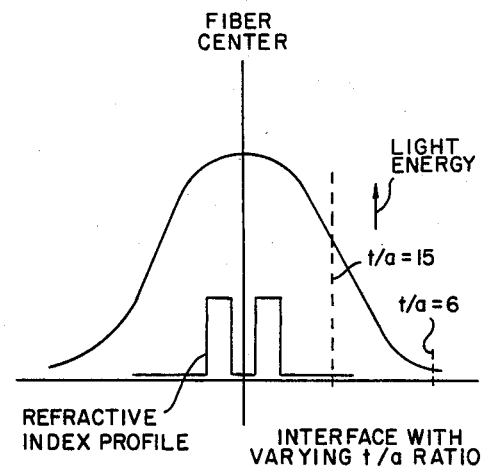
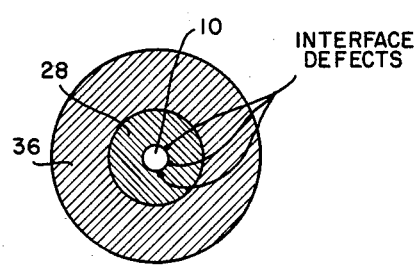
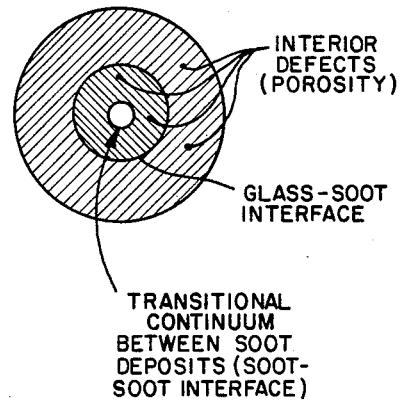

OPTICAL FIBER AND METHOD OF PRODUCING SAME

BACKGROUND OF THE INVENTION

1. Field of the Invention

This invention relates to production of high purity, low attenuation optical fibers, and is particularly concerned with novel high silica optical fibers and methods of fabricating such fibers employing a radial vapor deposition technique.

It is well known that light can be caused to propagate along a waveguiding structure comprising a transparent core which has a higher refractive index than a surrounding transparent cladding. Very small diameter optical fibers based on this principle are increasingly being used to transmit extremely wideband modulated signals over long distances. Optical fibers produced for these purposes must have low signal attenuation (e.g. less than 1 dB/Km), which inherently requires not only that the materials be of high light transmissivity but also that defects in the form of seeds (a term widely used in the glass industry to designate bubbles) and other discontinuities be minimized. The fibers should also introduce low dispersion in the transmitted light, and should allow only preselected modes of light to propagate along the fiber.

Producing satisfactory optical waveguiding fibers has been one of the more difficult problems in the development of modern optical communication systems. At this time the primary applications of optical fibers are in telephony, but the technology is being extended to many other data transmission applications such as CATV, computers and other industrial and military applications. Single mode optical systems are particularly suited for high capacity long distance communication systems because of the extremely wide bandwidths and uniform transmission characteristics they provide. A very thorough discussion of the operating theories of single mode fiber is contained in the publication "Understanding Monomode Optical Fibers" by A. W. Snyder, *IEEE Proceedings*, Vol. 69, No. 1, p. 6 (1981). Other excellent sources of information concerning single mode fiber and transmission systems are "Components and Systems for Longwavelength Monomode Fibre Transmission," by Garrett and Todd, *Optical and Quantum Electronics*, 14, p. 95–143 (1982) and "Low Loss Single Mode Fiber Development and Splicing Research in Japan", by H. Murata and N. Inagaki, *IEEE Journal of Quantum Electronics*, Vol. 17, No. 6, p. 835 (1981).

Low loss single mode fibers for high capacity long distance transmission systems are presently virtually all made of high silica vapor deposited glass. The primary reason for using high silica glass is its optical transmission characteristics, primarily its low scattering in the near infra-red region of the optical spectra where suitable light sources are available. The advantages of vapor deposition technology reside in the purity of the glass that can be produced and the control of dimensions and refractive indices of the core and cladding that can be achieved. Most transmission systems using optical fibers are based on wavelengths between 600 and 1600 nanometers (nm), with 1300 nm currently being widely employed.

2. Description of the Prior Art

The prior art discloses optical fibers or waveguides using high silica materials and methods of making high purity high silica glass by chemical vapor deposition followed by sintering to provide optical fiber preforms which can be drawn into optical fibers of suitably small dimensions. The desirability of making waveguiding optical fibers with high silica materials in which the core contains silica of higher refractive index than a pure fused silica outer cladding was first identified by E. Ronald Schineller. This work is described in his report "Summary of the development of optical waveguides and components", *NASA CR*-860, published (1967) by Clearinghouse for Federal Scientific & Technical Information, Springfield, Va. 22151. Subsequently, others adapted chemical vapor deposition techniques to this particular application, and a number of variations are now employed by various manufacturers.

Chemical vapor deposition techniques for producing high purity silica glasses were originated in at least the 1930's. U.S. Pat. No. 2,272,342 issued to J. F. Hyde teaches a vapor deposition technique for making transparent fused silica. Vapors of halides of glass forming oxides are fed through an oxy-gas burner to oxidize and form sub-micron particles of glass (generally called "soot"). This soot is deposited at low temperatures as a porous preform or at higher temperature in the form of a clear glass. Also it is disclosed that the porous glass preform can subsequently be heated to sinter by viscous flow to form a clear glass. Later U.S. Pat. No. 2,326,059 to M. E. Nordberg teaches fabricating a silica glass doped with titania, which raises the refractive index of the body along with lowering its expansion coefficient.

U.S. Pat. No. 3,737,292 issued to D. B. Keck is illustrative of one widely used technique for forming optical waveguides. The patent describes deposition on a glass target rod to form a preform for optical fiber, in which process the target glass rod is subsequently removed prior to sintering because it is considered undesirable to leave it as a part of the preform and the resultant fiber. A central hole in the core structure is collapsed during the subsequent drawing step. Although the central void is ostensibly filled in this process, there are in fact some discontinuities introduced that tend to affect light propagation characteristics as in U.S. Pat. No. 4,157,906 to Bailey. Also, to minimize stress breakage, complex composition and viscosity gradients need to be built into the preform as in U.S. Pat. Nos. 4,344,670 (Blankenship), 4,358,181 (Gulati et al), and 4,251,251 (Blankenship). Other U.S. patents that describe methods of fabricating preforms by radial vapor deposition where the target rod or mandrel is removed, commonly known as the outside process, are U.S. Pat. Nos. 3,823,995; 3,884,550; 4,135,901 and others. U.S. Pat. No. 3,775,075 issued to D. B. Keck describes deposition of cladding glass of lower refractive index on a polished glass rod which acts as the core of the fiber and is not removed. In this process, the core rod must be properly dimensioned and finished in order to provide a proper core when the preform is drawn down to fiber diameter. Even so, the surface of the core rod can have imperfections, and the discontinuity between the core rod and deposited cladding tends to introduce seeds during subsequent processing steps.

A later variant of this technique is disclosed in U.S. Pat. Nos. 4,298,366 and 4,423,925, in which the original start rod is a cylindrical glass rod of pure fused silica on which a core layer of borosilicate soot of varying refractive index is deposited. After sintering, the preform is drawn down to a smaller size and a cladding layer is then deposited for final vitrification and drawing to an optical fiber. The area of the original pure fused silica rod is, in this structure, less than 10% of the cross-sectional area of the fiber so as to have the effect of a gradient index fiber despite the presence of the constant index region at the center. There are, however, two discontinuities in this structure, at the boundaries between the original start rod and the core, and between the sintered core and outer cladding. Minute surface imperfections in either boundary region constitute sites for the growth of defects. These approaches utilizing borosilicate compositions whether they are gradient index multimode or for single mode designs, cannot be used to produce low loss fibers at 1.3 μm because of infrared absorption edge characteristics of boron trioxide.

Another process category where preforms are made by deposition on the inner surface of a substrate tube (known as the inside process) are described in U.S. Pat. No. 3,711,262 and others. The inside processes also suffer from severe limitations in preform size due to restrictions imposed by the substrate tube. Furthermore substrate tube geometrical tolerances and glass quality have strong impact on fiber geometry control and fiber strength. Again, the structure must be collapsed to fill a central void, so that imperfections tend to appear, reducing quality or yield or both.

Yet another process category, using deposition axially on the end of a mandrel, is called the vapor axial deposition process. This process is described in U.S. Pat. Nos. 3,966,446; 4,017,288; 4,135,901; 4,224,046; 4,231,774 and others.

Hybrid techniques whereby a core is formed by axial deposition and a cladding layer is formed simultaneously by radial deposition are described in U.S. Pat. Nos. 3,957,474 and 4,062,665. Substantially continuous methods of forming optical fibers by vapor deposition are described in U.S. Pat. No. 4,230,472. In this patent a substantially continuous core member is longitudinally translated on which cladding glass is deposited, the porous preform being sintered and drawn into fiber continuously.

The axial process produces fiber with excellent transmission characteristics. However, preforms from this process suffer from axial variability of dimensions as well as refractive index profile. Also, with the axial deposition process it is difficult to produce fiber with the high cladding to core ratio required for single mode fiber. Furthermore, there is a need to control temperature very precisely on the deposition surface, and this limits the rate at which material can be deposited.

The outside vapor deposition process, which is really a radial vapor deposition process utilizing a removable mandrel, has produced the largest preform and has demonstrated the highest deposition rate per burner. However, the necessity of mandrel removal restricts the length of preform that can be made using this process and adds an additional process step of mandrel removal. In addition the force of mandrel removal can damage the inside surface of the preform causing seeds in resultant fibers adversely affecting optical performance by introduction of light scattering and attenuation.

A variant on this technique that suffers from the same problems is disclosed in U.S. Pat. No. 4,298,365, in which successive layers of glass soot are deposited on a removable cylindrical mandrel. A stratum of low viscosity glass soot is applied, followed by first and second glass soot coatings of successively higher viscosity but with different indices of refraction. The differing viscosities are required because of the necessity of collapsing the central aperture formed when the mandrel is removed. Although the stratum is required to be thick enough to form a continuous layer after mandrel removal, it still constitutes an irregular surface that tends to introduce defects that attenuate light or render the optical fiber non-concentric.

Processes of vapor deposition on a removable mandrel or glass target, or on the inside wall of a tube, require ultimately that the structure be collapsed to close the center hole. Such collapse is difficult to achieve without creating an irregularity in the center refractive index due to outer diffusion of dopants. Furthermore, core/cladding concentricity can suffer, especially when deposition is performed inside a tube, since it is difficult to make tubes with truly concentric walls.

The hybrid or continuous processes described may not be economically viable for fiber manufacturing, due to their complexity.

Because the economics of the preform fabrication step in producing optical fiber primarily depend on the rate and efficiency of deposition, whereas the economics of downstream process steps in the fiber manufacturing primarily depend on the preform size, it is important to provide a process for producing optical fibers which makes large preforms at high deposition rates, with tight control on fiber parameters, including maintaining the core and cladding dimensions, in order that the resultant fiber be useful in actual practice. The core and cladding should have the desired difference in refractive index but also should contain a minimum number of interfaces to minimize the entrapment of tiny air bubbles and foreign particles at the interfaces, and the creation of other irregular sites of potential defects in the optical fibers. Interface defects in a preform are typically very minute and are not in any event subject to analysis except by destructive testing in the preform. They do not, however, diminish proportionally in size when the preform is drawn down to a very thin fiber. Instead, the seeds in the interface region become large relative to the fiber diameter and define light scattering centers at the interface regions. The volumetric density of the seeds directly affects the light transmissivity of the fibers. Other seeds can also be present, in the interior of a core or cladding volume, but these arise from imperfect deposition or sintering and must be separately confronted.

Improved transmissivity is constantly being sought in the current state of the art, and to this end workers in the field have also sought to minimize the losses to interface defects by placing the interfaces in a region containing relatively low light energy in the fiber structure. The confined light waves have a Gaussian energy distribution centered about the fiber axis and dropping to a low level where the ratio of cladding thickness (t) to core radius (a) is substantial. The practice has been to use a t/a ratio of 6 or 7 so that the interface is in the region of the skirts of the Gaussian curve, largely because dissimilar surfaces provided by the known processes have created levels of defects that did not tolerate other relationships.

SUMMARY OF THE INVENTION

Broadly, this invention relates to an optical fiber, particularly a single mode fiber, and a method of making the same, where an interface layer, a core shell and at least some of the cladding are successively deposited as glass soot on a small target rod of glassy material. A significant aspect of the invention is that in the only glass-soot interfaces the materials are alike (e.g. silica), whereas all other interfaces are of a soot-soot combination. Yet another feature resides in the fact that the core/cladding boundary is placed where the t/a ratio is less than about 1.5, while obtaining low attenuation properties and an excellent fiber length yield in relation to preform weight.

A porous first preform is deposited with core and cladding layers of selected weight and thickness ratio. Retaining the starting target rod in place, this first preform is dried and sintered into a clear vitrified form in a high temperature furnace with a controlled environment. This is then drawn into small diameter glass rods in a substantially water-free environment. Further cladding particulate may subsequently be deposited on these rods, so that another drying and sintering sequence is used. In any event the vitrified preform with the diminished target rod remaining in place is drawn into optical fibers having the desired characteristics of an effective optical waveguide. At each interface the soot deposition, by precisely matching the prior composition or the prior surface texture, provides a transitional continuum which minimizes the existence and creation of defect sites. The preform may be built up to substantial size, and thus when greatly reduced in the fiber drawing process the minute defects within the interior volume of a layer are significantly dispersed. The target rod is so small and of such transmissivity that it does not diminish wave propagation properties.

In optical fibers in accordance with the invention the central element is less than 2% in diameter relative to the diameter of the fiber, and less than about 20% of the diameter of the core of single mode fibers. The ratio of the cladding thickness (t) to the core radius (a) in the first or rod preform is in the range of 1 to 1.5, and large preform sizes having a given weight may be drawn into much greater lengths of optical fiber than can be processed for the same weight of preform having a much higher t/a ratio.

In this process, precise amounts of oxygen are bubbled through germanium tetrachloride and silicon tetrachloride, and the resulting vapors combined. These vapors are injected through a natural gas flame maintained at a precise temperature to react with oxygen. The first step is to deposit a thin layer of silica soot by moving the torch over the length of the rod while the rod itself is rotated. Then soot of silica-germania glass particles to define a core is deposited onto the soot-surfaced silica rod. This process produces an even thickness of silica-germania soot, which is then encompassed by an adherent silica cladding soot to a desired thickness. The process forms a porous rod preform which is sintered with the target rod in place to form a clear glass body which may then be placed in a draw tower and heated by an electric furnace to be pulled, or drawn down, to a small diameter core/cladding rod.

After the core/cladding rod is produced, silica soot is again deposited over the exterior in the manner described above to a desired final cladding thickness to form a preform for single mode optical fibers. That is, silica particulate formed by reacting precisely measured amounts of silicon tetrachloride and oxygen in a high temperature torch are reacted and the resulting silica soot is deposited radially on the rotating member to form an outer cladding layer. After sintering this layer with the now diminished target rod still in place, the body is drawn down to the desired final dimension, producing an optical fiber with a silica-germania core and silica cladding. In a single mode fiber for the 1300 nm region the core diameter is approximately 9 microns and the outer diameter is approximately 125 microns.

These, together with other objects, features and advantages of the present invention, will become apparent to those skilled in the art from the following detailed description and the attached drawings, which, by way of example, illustrate only the preferred embodiments of the invention.

BRIEF DESCRIPTION OF THE DRAWINGS

A better understanding of the invention may be had by reference to the following description, taken in conjunction with the accompanying drawings, in which:

FIG. 2 illustrates a sequence of steps for producing an optical fiber according to the invention, including production of a silica-germania core and silica cladding on a start rod, followed by sintering and drawing to define a smaller diameter core/cladding rod, and deposition of silica cladding, followed by sintering and drawing to produce the optical fiber;

FIG. 5 is an enlarged transverse cross-sectional view of a rod preform depicting interior defects as they typically appear within a core or cladding volume;

FIG. 6 is an enlarged transverse cross-sectional view of a rod preform depicting interface defects as they typically appear; and FIG. 7 is a graphical representation of light energy power distribution and refractive index profile in an optical fiber in accordance with the invention, useful in describing the advantages of the present method and apparatus.

DETAILED DESCRIPTION OF THE INVENTION

Figure 1:
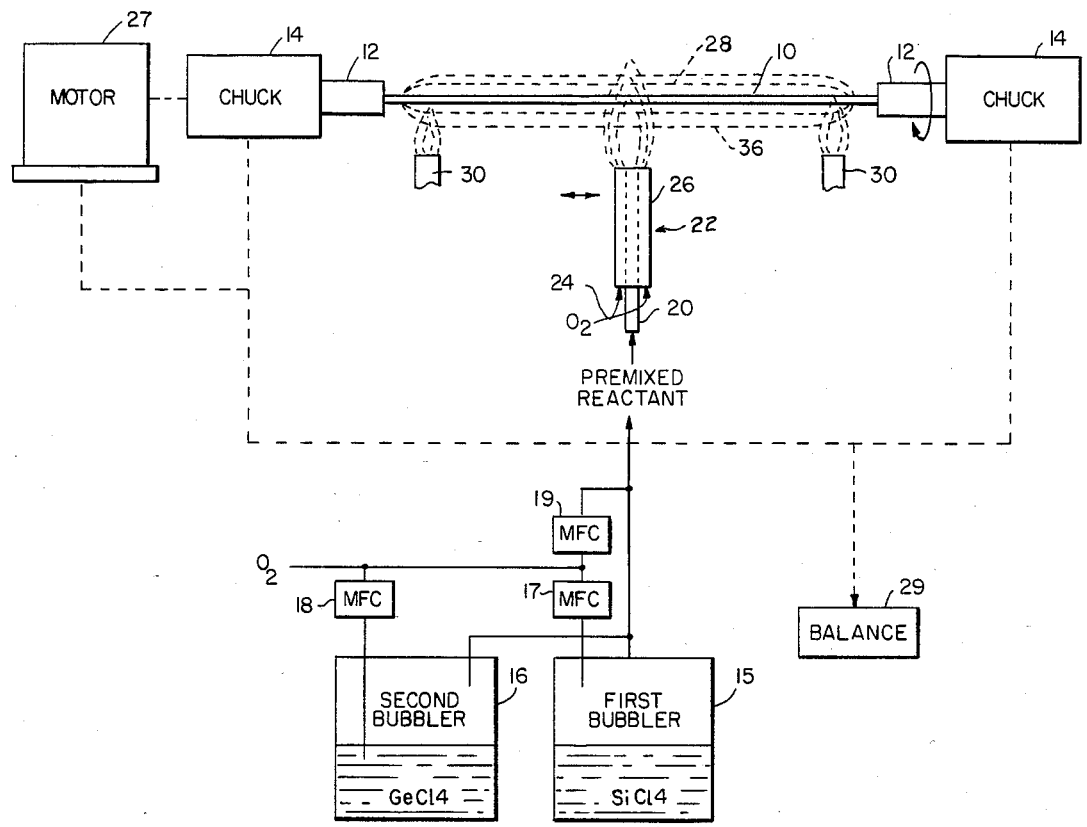
FIG. 1 is an illustration of apparatus for applying a silica-dopant soot to a target rod to produce a soot preform, according to the present invention.

Referring to FIGS. 1 and 2 of the drawings, the production of a first or rod preform consists of successive soot deposition steps using a small diameter start or target rod 10. The target rod 10 is typically a commercially available dry silica rod, e.g. of the type marketed as Diasil, of a relatively small diameter, preferably 2-5 mm in diameter, and which is relatively long, for example 25 cm in length. The target rod 10 can be dense or porous silica-containing elements of silica or silica-germania. In preferred practice high quality low water, low loss silica glass rods, preferably produced by vapor deposition, are employed, although sintered glass rods made by synthetic quartz manufacturing processes also can be employed. The initial target rod is restricted in cross section (to less than 10 mm in diameter) to minimize index distortion of the core, if the target rod is of a different refractive index than that of the core of the fiber. In most instances it is preferred to use a start rod of 3-5 mm in diameter. The start rod surface is properly cleaned to remove organic and inorganic particulates, by washing with distilled water and isopropanol. In any event the outside surface of the silica rod 10 is made substantially defect free by mechanical grinding and polishing procedures commonly employed in the glass industry. This, together with subsequent steps, virtually eliminates the formation of seed defects in the interface.

The target rod 10 is attached at its opposite ends to a pair of handle rods 12, preferably of commercial grade silica, and which can have a diameter of about 10 mm. The handles 12 are held in chucks 14 in a deposition hood (not shown). The chucks are coupled to a driving motor 27 for rotation of the handles 12 and rod 10 at a desired rotational speed, e.g. 45 rpm, to effect uniform deposition of soot layers thereon, as described below.

The rod preform produced according to the invention comprises successive layers of soot deposited on the target rod 10, starting with a thin silica interface layer 32, a core 28 and a cladding 36, as seen in the first element 38 in FIG. 2. To give the core glass 28 a higher index of refraction than the cladding 36 while operating a continuous process, the core glass is desirably formed of the same type of glass used for the cladding but doped with a small amount of another material to slightly increase the index of refraction thereof. Thus, if pure fused silica is used as the cladding glass, as is preferred, a dopant is added to the fused silica during the core deposition interval. Germanium oxide is preferred, although other oxides such as titanium oxide, other dopants such as phosphorus, and various oxides with organometallic source compounds of high vapor pressure and necessary purity can also be used, that are consistent with the properties and environment of the final product.

Reactant streams are generated from liquids contained in separate first and second bubblers 15 and 16 containing silicon tetrachloride and germanium tetrachloride, respectively, in this example. Oxygen is passed through the liquids in the bubblers, the source vapors used, and the proportion thereof if more than one is used being determined by the settings of conventional mass flow controllers (MFC) 17 and 18 in the lines to the separate bubblers 15, 16. Oxygen is also added to the vapor stream of silicon tetrachloride, with or without germanium tetrachloride, in a proportion determined by a separate mass flow controller, indicated at 19. The individual reactant streams are mixed in the vapor line and fed to the central tube 20 of an oxy-gas burner 22. An oxygen shield stream at 24 is provided around the premixed reactant flame stream to prevent reaction on the burner face causing undesirable buildup. An outer shield 26 is provided to control the flame shape, and the burner 22 is caused to traverse back and forth along the length of the soot covered target rod 10 while the rod is rotated. The reactant particles passing through the gas-oxygen flame are oxidized to form soot, that is, minute glass particles, with a composition as determined by the settings of the mass flow controllers 17, 18 at any point in time.

The glass soot leaves the flame of the burner 22 in a steady stream, and as the burner 22 traverses back and forth along the length of the rotating target rod 10, there are deposited layers of soot particles which build up to form dense but porous soot layers. The preform can contain 72% to about 89% voids. The individual layers of soot particles are deposited in helical-like paths of opposite inclination as the burner 22 traverses the rotating rod 10 in alternate directions.

The entire chuck 14, its mounts, the target rod 10 and the drive motor 27 are supported on a high resolution balance, indicated at 29, to accurately and continuously measure the weight of the deposited glass core on the rod 10. Two small oxy-gas heaters 30 are placed at the ends of the burner traverse to heat up the ends of the soot preform to prevent cracking because of temperature differentials.

Figure 4:
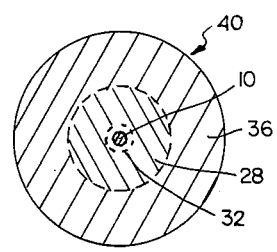
FIG. 4 is a transverse cross section, taken on line 4—4 of FIG. 3.
Figure 3:
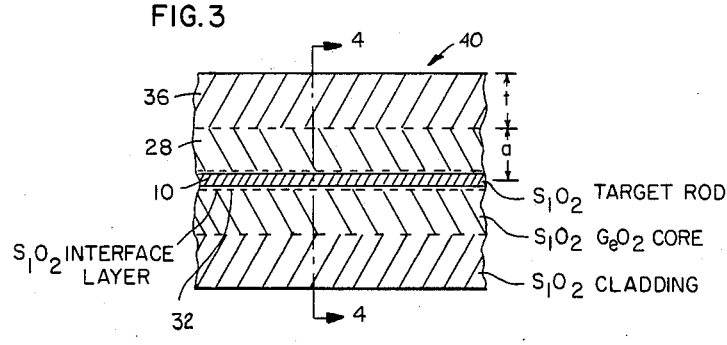
FIG. 3 is a longitudinal cross section of an exemplary core/cladding rod produced according to the process illustrated in FIG. 2.

In accordance with the invention, referring now as well to FIGS. 2-4, the deposition commences with formation of a first interface layer 32 of silica soot on the target rod 10, sufficient in thickness to provide a continuous surface matching the rod 10 in physical properties when vitrified, but providing a particulate surface corresponding to the outlying soot core 28 surface. Thus, only $SiCl_4$ is oxidized as this layer 32 is deposited, to a thickness of less than about 0.01 mm. Then, the core 28 is deposited by oxidizing a reactant stream of approximately 88% $SiCl_4$ and 12% $GeCl_4$, for long enough to build up a core diameter of greater than approximately 20 mm. When the desired diameter has been reached, as established by total weight increase on the balance 29, the vapor is returned to a $SiCl_4$ stream alone, to build up the cladding layer 36 to the desired final diameter, typically 40-80 mm.

At the interfaces between the innermost silica soot layer 32 and the inner surface of the core 28, and between the core 28 outer surface and the inner surface of the cladding 36, the unvitrified soot particles present, in microscopic view, somewhat non-uniform and intermingled boundaries. These define what may be termed transitional continuums between different structures. Upon vitrification and drawing to optical fiber dimensions no significant irregularities appear, but instead the layers are firmly united and substantially free of defects so that they do not provide minute sites for seeds to form. At the interface between the silica target rod 10 and the silica interface layer 32 the fusion of identical materials aids in reduction of defect sites on sintering. A typical deposition program for production of a porous rod preform 38 is shown in Table I below.

TABLE I

| CORE PREFORM DEPOSITION PROGRAM | | | | | | | | |
|---|---|---|---|---|---|---|---|---|
| | REACTANT FLOWS | | | | | | | |
| DEPOSITED WEIGHT (GMS) | CARRIER OXYGEN FOR | | EXCESS OXYGEN (slpm) | FLAME GAS (slpm) | FLAME OXYGEN (slpm) | INNER SHIELD OXYGEN (slpm) | OUTER SHIELD OXYGEN (slpm) | BURNER TRAVERSE SPEED (slpm) |
| | $SiCl_4$ (slpm) | $GeCl_4$ (slpm) | | | | | | |
| 0.3 | 1.3 | — | 0.6 | 3 | 6 | 2 | 5 | 14 |
| 90 | 1.8 | 0.5 | — | 3.5 | 7 | 2 | 5 | 50 |
| 180 | 1.8 | — | — | 3.5 | 7 | 2 | 5 | 43 |
| 240 | 1.8 | — | — | 3.5 | 7 | 2 | 5 | 36 |
| 300 | 1.8 | — | — | 3.5 | 7 | 2 | 5 | 28 |
| 360 | 1.8 | — | — | 3.5 | 7 | 2 | 5 | 21 |
| 400 | 1.8 | — | — | 3.5 | 7 | 2 | 5 | 14 |
| 540 | 1.5 | — | 0.4 | 3.5 | 7 | 2 | 5 | 14 |

The resultant porous rod preform 38 is then removed from the deposition hood and with the target rod 10 remaining in place, is inserted in a sintering muffle furnace having a uniform hot zone long enough in dimension to accommodate the entire preform. The furnace environment is clean and leak-free, and is fed with a controlled mixture of helium, chlorine and oxygen, to obtain a vitreous glass with low water content and which is seed-free in the interior of the vitrified regions. Drying is first accomplished by raising and holding the temperature of the preform at a uniform temperature between about 900° and 1200° C., for a sufficient period, e.g. about 30 minutes. Sintering is accomplished in a sequential step by raising the temperature of the furnace to the range of about 1400° to 1600° C. or by pulling the preform out of the furnace but keeping it in the controlled environment, raising the furnace temperature to the range of about 1400° to about 1600° C. and slowly feeding the preform back into the furnace to cause sintering and vitrification due to viscous flow. During sintering the entire preform including the rod 10 shrinks, e.g. by about 50%. The rod 10 shrinks in length but increases in diameter, although it does not become stressed because at the temperatures attained all of the layers are substantially uniformly heated and cooled.

The downfeed rate for sintering is a critical parameter for producing bubble-free glass. For a 200 gm rod preform a downfeed rate of 0.35 cm/min is satisfactory, but when preform size is increased to 540 gms, downfeed rate is reduced to 0.2 cm/min. Seeds arising from improper sintering are best observed after the preform is drawn down to rods for redeposition.

A typical sintering program is illustrated in Table II below.

defects that appear to be like devitrified silica. Drawing too hot causes seed formation due to reboil in the core, which has the lowest viscosity. The slower the downfeed rate in sintering, the higher is the upper limit for draw temperature in the rod drawing operation. Temperatures of 1980°–2030° C. for the narrow hot zone furnace and 1930°–2000° C. for the wide hot zone furnace are in the desired operating ranges. If the outside surfaces of the rods have defects, these can be removed by conventional grinding and polishing techniques. The rods 40 are typically cleaned with distilled water and isopropanol in preparation for the deposition of further cladding if desired.

To deposit further cladding, the drawn rods 40 with the vitreous silica-germania core 28 and cladding 36 are individually again mounted on the handle rods 12 in the apparatus illustrated in FIG. 1. A silica soot layer 42 is deposited as the rod 40 is rotated and the burner 22 is translated back and forth along the length of the rod, in the manner described above. For this purpose, silicon tetrachloride alone is vaporized and the vapor stream with oxygen fed to the burner 22 as described above. The resulting partially porous fiber preform 44 (see FIG. 2) containing the initially vitrified silica-germania core 28 and the vitrified silica cladding 36, with the diminished target rod 10 still in place is then sintered by the procedure previously described to form vitreous silica preforms with the desired refractive index profile and dimensions for drawing into optical fibers, particularly single mode optical fibers. The resulting fiber preforms 44 generally have a diameter greater than 20 mm, e.g. 30–50 mm. Such preforms 44 are then drawn into optical fibers 46 of diameters dependent on the operating wavelengths of the fibers.

TABLE II

SINTERING PROGRAM

| EVENT | SEGMENT TIME (MIN) | ELAPSED TIME (MIN) | TEMPERATURE °C. | FLOW CHLORIDE (sccm) | FLOW HELIUM (sccm) | FLOW OXYGEN (sccm) | PREFORM FEED SPEED (cm/min) |
|---|---|---|---|---|---|---|---|
| HEAT-UP | 20 | 20 | 1000→1200 | 350 | 5000 | 500 | — |
| HOLD FOR DRYING | 30 | 50 | 1200 | 350 | 5000 | 500 | — |
| WITHDRAW PREFORM FROM HOT ZONE | 10 | 60 | 1200 | 350 | 5000 | 500 | 3.8 |
| HEAT-UP | 40 | 100 | 1200→1500 | 75 | 5000 | — | — |
| SINTER | 180 | 280 | 1500 | 75 | 5000 | — | 0.2 |
| COOL-DOWN | 30 | 310 | 1500→1000 | — | — | — | — |

The rod preform 38, now sintered into a vitreous glassy mass, is then drawn down to rods 2 to 7 mm in diameter, as illustrated at 40 in FIG. 2, in a carbon resistance furnace having a substantially water-free environment. Each preform can produce twenty (20) to forty (40) rods. The draw temperature is critical for this operation. Drawing below a certain temperature (1980° C. for a narrow hot zone furnace and 1930° C. for a wide hot zone furnace) produces rods with surface An example of processing conditions for fabrication of a fiber preform designed for an operating wavelength of 1.3 μm is shown in Table III. A drawn rod 40 cm in length with 5.2 mm diameter, t/a of 1.45 and normalized refractive index difference, Δ, of approximately 0.3% is used. The deposition in this step is approximately 800 gms of silica. The deposition process and the subsequent sintering process to complete the preform fabrication may otherwise be the same as described above.

TABLE III

FIBER PREFORM DEPOSITION PROGRAM

| | REACTANT FLOWS | | | | | | |
|---|---|---|---|---|---|---|---|
| DEPOSITED WEIGHT (GMS) | CARRIER OXYGEN FOR SiCl$_4$ (slpm) | EXCESS OXYGEN (slpm) | FLAME GAS (slpm) | FLAME OXYGEN (slpm) | INNER SHIELD OXYGEN (slpm) | OUTER SHIELD OXYGEN (slpm) | BURNER TRAVERSE SPEED (slpm) |
| 80 | 1.8 | .1 | 4 | 8 | 1.8 | 5 | 35 |
| 120 | 1.8 | .1 | 4 | 8 | 1.8 | 5 | 30 |
| 200 | 1.8 | .1 | 4 | 8 | 1.8 | 5 | 25 |

TABLE III-continued

| | FIBER PREFORM DEPOSITION PROGRAM | | | | | | |
|---|---|---|---|---|---|---|---|
| | REACTANT FLOWS | | | | INNER | OUTER | BURNER |
| DEPOSITED WEIGHT (GMS) | CARRIER OXYGEN FOR SiCl4 (slpm) | EXCESS OXYGEN (slpm) | FLAME GAS (slpm) | FLAME OXYGEN (slpm) | SHIELD OXYGEN (slpm) | SHIELD OXYGEN (slpm) | TRAVERSE SPEED (slpm) |
| 280 | 1.8 | .1 | 4 | 8 | 1.8 | 5 | 20 |
| 350 | 1.8 | .1 | 4 | 8 | 1.8 | 5 | 17.5 |
| 400 | 1.8 | .1 | 4 | 8 | 1.8 | 5 | 15 |
| 450 | 1.8 | .1 | 4 | 8 | 1.8 | 5 | 12.5 |
| 500 | 1.8 | .1 | 4 | 8 | 1.8 | 5 | 10 |
| 550 | 1.6 | .3 | 4 | 8 | 1.8 | 5 | 10 |
| 600 | 1.5 | .4 | 4 | 8 | 1.8 | 5 | 10 |
| 650 | 1.4 | .5 | 4 | 8 | 1.8 | 5 | 10 |
| 700 | 1.3 | .6 | 4 | 8 | 1.8 | 5 | 10 |
| 750 | 1.2 | .7 | 4 | 8 | 1.8 | 5 | 10 |
| 800 | 1.1 | .8 | 4 | 8 | 1.8 | 5 | 10 |

It is desirable particularly for the production of single mode optical fiber according to the invention, that the cladding thickness to core radius ratio, t/a, of the rod preform 38 be kept substantially lower than heretofore used. Preforms for single mode optical fibers produced according to the invention can have a t/a ratio of less than or equal to 1.5, e.g. 1–1.5.

The light conducting region of the fiber, referring now to FIG. 7, is distributed between the core and cladding and has a Gaussian distribution which extends out to the skirt regions of the Gaussian curve where the light energy is of low amplitude. Partly by virtue of the low defect density at the interface regions achieved by applicant's process, however, applicant has moved this interface inwardly such that the t/a ratio in the rod preform 38 is preferably 1 to 1.5 rather than 6 or 7. Consequently a given rod preform weight provides a greater length of drawn core than has heretofore been achieved. The overall soot deposition process thereby becomes more efficient. The process is completed by application of the outer cladding layer (42 in FIG. 2), which can increase the fiber preform 44 to in excess of 20 mm in diameter. For a single mode optical fiber, the overall t/a ratio is increased to the range of 10–30 (e.g. 14 for a 1300 nm fiber). In fibers in accordance with the invention excellent optical properties are achieved because interface defects at the cladding boundaries are minimized and do not provide seed sites even though one is in a region of propagation of substantial light energy.

The power distribution of the transmitted light in the fiber can also be related to the core and cladding by reference to the refractive index profile of FIG. 7. In FIG. 7 the two maximum index sections on each side of the fiber center relate to the opposite sides of the doped core, while the very center corresponds to the target rod and the outside portions correspond to the cladding.

A feature of the present invention is that the number of glass-soot interfaces within the fiber is restricted to a maximum of two, and preferably to one. Thus, viewing FIGS. 2 and 3, according to this exemplification, there is a glass-soot interface between the target rod 10 and the immediately adjacent thin silica layer 32, and a glass-soot interface between the inner and outer cladding layers 36, 42. The interfaces, however, are of like silica materials in each instance, even though the layer 32 is thin. Glass-soot interfaces of this character reduce the amount of light scattering centers in the resultant optical fiber. The interface between the core 28 and deposited cladding 36 is a soot-soot interface and has a lower probability of developing scatter centers because of the intermingling of soot particles and the concurrent sintering of layers, which may also be termed co-sintering.

FIGS. 5 and 6 depict, with reasonable similarity to rod preform photographs, the manner in which defects appear within the interior of a layer and at layer interfaces, respectively. The seeds in the rod preforms are much more readily observed under microscopic enlargement than later, and demonstrate that minute defect sites are not drawn down as the rod preform is reduced in diameter. Because the interface seeds are concentrated and in a region of high light energy, they can adversely affect the light propagating qualities of the fiber. The porosity defects (FIG. 5) are distributed through the interior of the layer and are minimized by careful control of the deposition and sintering procedures. Once the fiber is drawn to a final size (e.g. in the range of 100–125 microns) a comparable optical examination is not feasible and properties are best evaluated in terms of attenuation per unit length.

The initial target rod 10 can be of low loss water fused silica or low loss germania doped silica target rod with refractive index matched with that of the core. The latter alternative will permit utilizing larger target rods. This would improve process materials utilization since in a radial vapor deposition process, collection efficiency is a strong function of target rod diameter. Such silica-germania glass rods may be conveniently made by a process of vapor axial deposition. Another alternative is that the target rods themselves may be soot rods made by vapor axial deposition.

Although the invention process is designed preferably for producing single mode optical fibers or waveguides, the invention process can also be applied for the production of multimode optical fibers or waveguides.

The following are examples of practice of the invention:

EXAMPLE I

This example was designed to evaluate the cross-section of silica rod which could be fused silica, in a silica-germania core, to produce low loss optical fiber.

Three preforms were made using a silica rod, silica-germania core and silica cladding, with different diameter ratios of silica rod to core, according to the invention process described above. Experimental parameters, calculated diameter ratios and the measured loss in resultant fibers is shown in the Table below.

TABLE IV

| Run No. | Wt. Silica start rod (gm) | Wt. Core (gm) | Wt. Total (gm) | Dia. Silica Rod Dia. Core % | Loss at 1.3 μm (dB/Km) |
|---|---|---|---|---|---|
| 1 | 3.9 | 50 | 220 | 27.9 | 4.1 |
| 2 | 3.9 | 90 | 220 | 20.0 | 0.66 |
| 3 | 3.9 | 120 | 220 | 18.0 | 0.48 |

From Table IV above it was concluded that in order to have low loss of about 0.66 dB/Km or less, as in Runs 2 and 3, the ratio of the diameter of the silica start rod to the core diameter must be less than or equal to 20%. Further, the core weight must be greater than 20 times the start rod weight.

EXAMPLE II

This test was conducted to evaluate what the cladding thickness to core radius ratio, t/a in the rod preform, needs to be to produce long lengths of single mode fiber. Optimizing this parameter is important as the larger the t/a ratio the larger one needs to make the preform and the better the fiber performace. On the other hand it is more economical to make core preforms with as small a t/a ratio as possible because it is then feasible to make a longer length of fiber from an equal weight size core preform. Following are the design parameters and the results obtained in fiber lengths of approximately 1-2 Km.

TABLE V

| Run No. | Wt. Core (gm) | Wt. Total (gm) | t/a | Loss at 1.3 μm (dB/Km) |
|---|---|---|---|---|
| 1 | 120 | 220 | 0.35 | 1.1 |
| 2 | 90 | 400 | 1.1 | 0.68 |
| 3 | 90 | 540 | 1.45 | 0.57 |

From Table V above it was concluded that for low loss fiber of about 0.68 dB/Km or less, as in Runs 2 and 3, the t/a ratio of about 1 to about 1.5 is satisfactory. However, with improved finishing of rod surface and improved processing conditions, low loss fibers with even lower t/a ratio can be produced. Further, the cladding weight must be greater than three times the core rod weight for low loss of 0.66 dB/Km.

From the foregoing, it is seen that the invention provides a simple and economic process for the production particularly of single mode optical fibers or waveguides by the steps including deposition of doped silica core and silica cladding on a rotating rod of high purity glass to form a porous preform, sintering the porous preform with the starting rod in place to form a clear, dense rod preform, drawing the rod preform down to about the original rod size, and repeating the above steps but depositing additional silica soot cladding over the rod preform, to provide a final fiber preform of the desired refraction indices and dimensions for sintering with the start rod in place and drawing into single mode optical fiber of the desired operating wavelengths.

Although the present invention has been described with respect to specific details of certain embodiments thereof, and since various changes and modifications of the invention will occur to and can be made readily by those skilled in the art without departing from the invention concept, the invention is not to be taken as limited except by the scope of the appended claims.

What is claimed is:

1. A process for producing optical fiber which comprises:
    depositing a soot comprising silica by vapor deposition along the length of a rotating thin silica target rod, to produce a first porous preform having both core and cladding portions;
    sintering said first porous preform with said target rod in place.
    drawing said sintered preform to a rod, to diminish the dimensions of said thin target rod,
    depositing a soot comprising silica on said drawn rod by vapor deposition along the length of said drawn rod to produce a fiber preform having both sintered and porous portions;
    sintering said fiber preform with said drawn rod remaining in place; and
    drawing said sintered fiber preform to further diminish the dimensions of said thin target rod and to provide an optical fiber.

2. The process of claim 1, including initially depositing by vapor deposition a thin layer of silica soot on said rotating target rod to provide a soot interface of the same composition as said target rod between said target rod and said core.

3. The process of claim 1, wherein the step of producing a first porous preform comprises first depositing on the target rod a predetermined amount of silica containing a dopant that raises the refractive index and then depositing an additional layer of silica on said core, to form at least a portion of the cladding of the optical fiber, the ratio of the thickness (t) of the cladding to the radius (a) of the core being less than 1.5 in the drawn rod.

4. The process of claim 3, wherein the step of depositing silica soot on the drawn rod comprises depositing sufficient soot to provide an overall t/a ratio of from 10 to 30, and wherein the process generates only glass-soot interfaces of like material and soot-soot interfaces.

5. The process of claim 4, wherein said target has a diameter of the less than 10 mm, wherein the first porous preform is in excess of 300 gms, and wherein the drawn sintered rod is less than 10 mm in diameter.

6. The process of claim 1, wherein said soot comprising silica and a dopant forming said core, and said soot of silica forming said cladding, are each deposited in the form of layers of a dense but porous soot preform, by traversing discharge of said soot back and forth initially along the length of the rotating target rod and thereafter along the prior deposits, said layers of soot forming said core and said layer of soot forming said cladding being deposited to a predetermined thickness with the deposit of dopant being terminated at the interface between core and cladding.

7. The process of claim 6, wherein the amount of deposited soot is determined by weighing the rotating structure during deposition, and further including the step of continually heating the ends of the rotating preform.

8. The process of claim 7, wherein the first porous preform is sintered by being fed into a heated controlled environment at a rate of 0.2 to 0.35 cm/min, and wherein the sintered preform is drawn to a rod at a temperature of 1930°-2030° C.

9. The process of claim 8, the number of originally glass-soot interfaces within the light carrying region of said optical fiber being not more than 2.

* * * * *